(No Model.)

T. H. TRAUERNICHT.
ELECTRIC AMALGAMATOR.

No. 358,002. Patented Feb. 15, 1887.

Witnesses.
A. Ruppert.
Thomas P. Simpson

Inventor.
Theodor Hermann Trauernicht

UNITED STATES PATENT OFFICE.

THEODOR HERMANN TRAUERNICHT, OF LEAD CITY, DAKOTA TERRITORY.

ELECTRIC AMALGAMATOR.

SPECIFICATION forming part of Letters Patent No. 358,002, dated February 15, 1887.

Application filed June 1, 1886. Serial No. 203,857. (No model.)

*To all whom it may concern:*

Be it known that I, THEODOR HERMANN TRAUERNICHT, a citizen of the United States, residing at Lead City, in the county of Lawrence and Territory of Dakota, have invented certain new and useful Improvements in Electric Amalgamators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention will first be described in connection with the drawings, and then pointed out in the claim.

Figure 1:
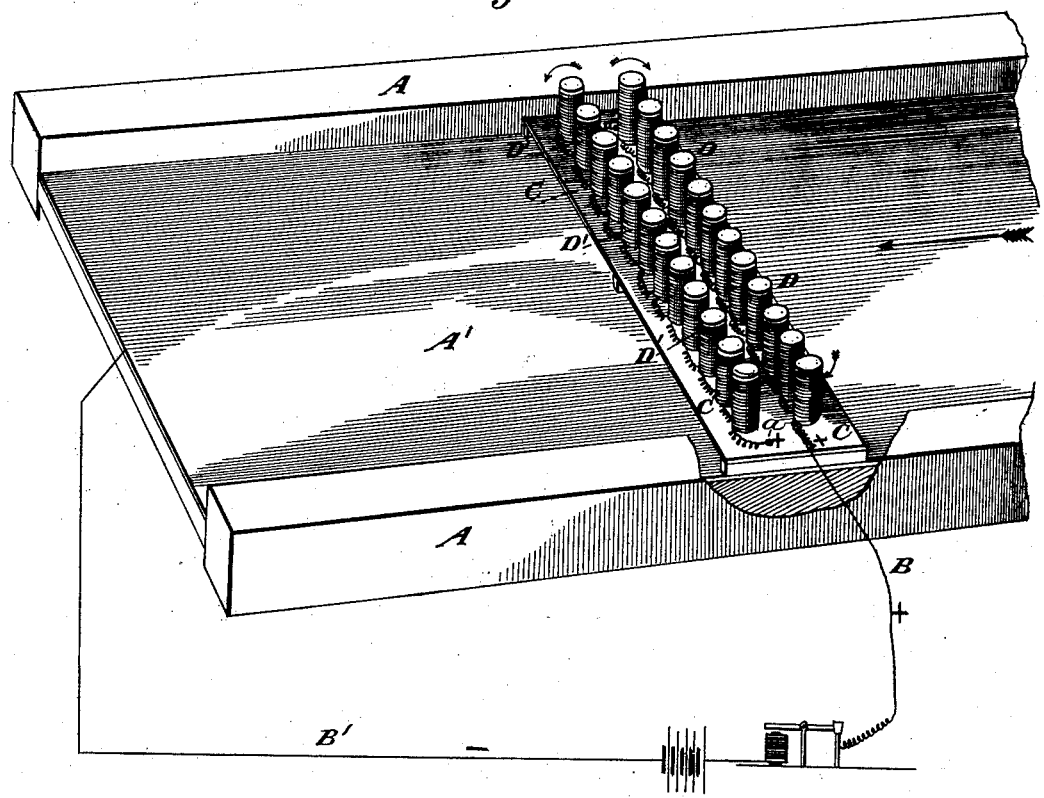
Figure 2:
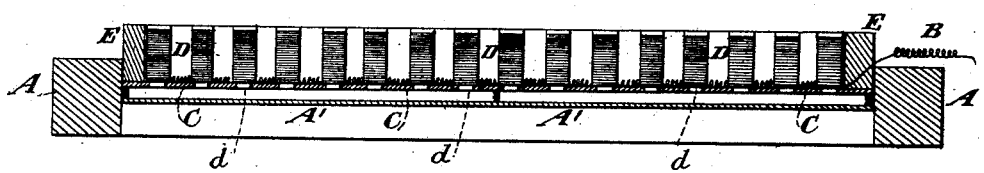

Figure 1 is a perspective of a portion of an amalgamating-table with amalgam plate in position, and Fig. 2 is a transverse section of the same.

In the drawings, Fig. 1, A' represents the amalgam plate in its place on the table A. I place across the amalgam plate A' the copper or other metallic plate C in such a way that the latter touches the water without coming in contact with the former, using supports made of or covered with a substance which is a bad conductor of electricity. In the plate C, I make two or more rows of holes and arrange in them soft-iron bars $d$, Fig. 2, which extend through the plate and are flush with the bottom thereof. The positive current B of an electric battery or of any other source of electricity is connected with an "automatic break," and then passed to and around the soft-iron bars $d$, Fig. 2, in such a way that the ends of one row have the opposite magnetic pole to the corresponding ends of the next row. The wire carrying the positive current, after having been coiled around the soft-iron bars $d$, is then soldered to the plate C at the point $a$, Fig. 1. The negative pole B' of the same battery or other source of electricity is lastly electrically connected with the amalgam plate A'.

It is well known that when amalgam plates are used for the collecting of gold and silver from their respective ores these ores are, after having been pulverized, washed over and down the inclined plane of the plate by a stream of water. Whether electricity be employed or not, the iron particles in the ore thus treated tear or break up a considerable quantity of amalgam, which, on account of its atomized condition, is carried off by the water, causing a loss of precious metal, as well as of mercury. This circumstance has made it unprofitable to work low-grade gold and silver ores in mining districts where iron abounds in these ores. It will be seen that this evil is remedied by my improved method of amalgamating.

When the pulverized ore is washed over and carried down the inclined plate, the particles of iron in the ore are attracted by the soft-iron bars $d$ or magnets D $d$, forming the upper row; but as soon as the electrical current is broken the coil-bars D $d$ become demagnetized, while the second row of soft-iron coil-bars D' $d$, having an opposite magnetic pole, (when electrically influenced,) cause the iron particles to turn over, and this may be continued from row to row until the ore has passed over the plate. This operation effectually prevents the breaking up and sweeping away of the amalgam, and is especially valuable in gold and silver ores which carry more or less of iron in either a pure or oxidized condition. The iron particles are in their course over the table kept floating in the water. The action of the automatic break prevents them from permanently adhering to the electro-magnets, and as the poles above them change they turn (being now momentarily magnets themselves) and release such particles of precious metal as would otherwise be mechanically carried along by them.

I am aware that it is not new to combine an electric battery having one pole in mercury and the other in water with riffles that act as cathodes, revolving and stationary anodes, and mechanical stirrers, the object being to produce a constant agitation that will prevent sand from forming a layer over the mercury, and thus afford the mercury an opportunity to contact perfectly with the precious metal; but What I do claim as new, and desire to protect by Letters Patent, is—

In an electric amalgamator, the combination, with the amalgam plate, of an electric battery, an automatic break, a superposed transverse copper plate, C, arranged to come in contact with the water in which the comminuted ore is carried over the plate, but not with the plate, and the transverse rows of soft-iron bars $d$, said bars being surrounded by coils, being extended through the copper plate until flush with its lower side, and the alternate rows thereof having opposite magnetic poles, whereby said bars will be alternately magnetized and demagnetized, so as to cause the particles of iron to float, turn over, and give up the gold or silver in the manner described.

In testimony whereof I affix my signature in presence of two witnesses.

THEODOR HERMANN TRAUERNICHT.

Witnesses:
A. RUPPERT,
M. A. BALLINGER.